United States Patent Office 3,038,815
Patented June 12, 1962

3,038,815
AMIDATION PRODUCTS OF CRUDE PARAFFIN OXIDATION MATERIAL
Josef Kaupp, Walter Brotz, and Oswald Metz, Gersthofen, near Augsburg, Germany, assignors to Farbwerke Hoechst Aktiengesellschaft vormals Meister Lucius & Brüning, Frankfurt am Main Hochst, Germany, a company of Germany
No Drawing. Filed Oct. 14, 1958, Ser. No. 773,803
Claims priority, application Germany Oct. 17, 1957
17 Claims. (Cl. 106—287)

The present invention relates to amidation products of crude paraffin oxidation material and to a process for their manufacture.

It is known to react long chain organic acids or the derivatives thereof capable of yielding amides with di- or polyamines to obtain the corresponding amides. As acids there have been proposed pure fatty acids, mixtures of fatty acids, for example acid fractions from the paraffin oxidation, or wax acids such as montan wax acids, as well as dicarboxylic acids and mixtures of fatty or wax acids with dicarboxylic acids. Amides of fatty acids of low or medium molecular weight are moderately hard and still have a coarsely crystalline structure. In general, the hardness and the brittleness increase as the chain length increases.

Now, we have surprisingly found that industrially valuable amidation products having substantially modified properties can be produced by catalytically oxidizing paraffin hydrocarbons of high molecular weight having a solidification point of above 60° C. with air until at least 80% of the paraffin is converted into oxygen-containing derivatives, and by reacting the crude air oxidation products obtained with polyvalent amines containing two primary amino groups or one primary amino group and, in addition, one or several primary OH groups. It is likewise possible additionally to treat the air oxidation products with chromosulfuric acid in an amount which is insufficient for the complete conversion into carboxylic acids and then to react the air/chromosulfuric acid oxidation products thus obtained as described above.

The paraffin is catalytically oxidized with air in known manner, in general at 130–160°. Higher or lower temperatures may likewise be used. It has proved to be advantageous to oxidize the paraffin until more than 90% thereof is converted into oxygen-containing derivatives, that is to say products which contain acid, ester, alcohol and/or keto groups. Thus, mixtures of oxidation products are obtained which are oxidized to a most varying degree. An air oxidation product, for example, having a residual paraffin content of about 13.5% has an acid number of 30, a saponification number of 70, a hydroxyl number of 22 and a carbonyl number of 85.

As starting material for the manufacture of the paraffin oxidation products, there may be used paraffins of natural or synthetic origin, for example well refined petroleum paraffins or preferably hydrocarbon mixtures from the catalytic carbon oxide hydrogenation as far as they have a solidification point of above 60° C., particularly above 85° C., or mixtures thereof containing at most about 40% of polyethylene of low molecular weight. The crude paraffin oxidation products mentioned may be admixed with dicarboxylic acids capable of forming polyamides or the amidatable derivatives thereof, such as esters, acid anhydrides, acid halides, for example chlorides. The dicarboxylic acids or the derivatives thereof may be added before or during the reaction of the paraffin oxidation products with polyamines. It is advantageous to condense the paraffin oxidation products and the dicarboxylic acids together with the polyamines.

As dicarboxylic acids, there may be used aliphatic, cycloaliphatic and aromatic dicarboxylic acids such as succinic acid, maleic acid, glutaric acid, adipic acid, sebacic acid, phthalic acid, isophthalic acid, terephthalic acid, cyclohexyl-p-dicarboxylic acid, diphenoxy-acetic acid dimethylmethane, diphenoxy-butyric acid dimethylmethane, resorcindiacetic acid and benzidin-diacetic acid. The two latter acids can be obtained, for example, by reacting alkali metal phenolates or of a free benzidine with chloro-acetic acid. The amounts of the dicarboxylic acids added may vary within wide limits. It is of advantage to add up to 20%, preferably 2–15% by weight, calculated on the paraffin oxidation product used. The optimum addition can easily be found by a simple experiment and depends on the desired combination of the various properties. In general, the air oxidation products are treated with chromo-sulfuric acid at a temperature in the range of from 90° C. to 140° C. in an amount such that carboxyl groups are additionally formed but a complete conversion of the oxygen-containing paraffin derivatives into carboxylic acids is avoided. Amounts of $CrO_3$ ranging from 50 to 90% by weight, calculated on the air oxidation product, are generally sufficient.

The paraffin oxidation products are reacted with the amines suitable in the process of the invention in known manner at a temperature above 100° C., for example 150–250° C. As amine components there may be used aliphatic diamines, such as ethylene diamine, propylene diamine, butylene diamine, hexamethylene diamine; carbocyclic diamines such as the isomeric diamino-cyclohexanes, 4,4' - diamino-dicyclohexylmethane, benzidine, tolidine, dianisidine or 4,4'-diamino-diphenylmethane. There are also suitable polyamines containing two primary amino groups such as diethylene triamine, dipropylene triamine, dibutylene triamine of which essentially the two primary amino groups are reacted. Instead of the diamines there may also be employed amino alcohols containing in the molecule, in addition to at least one free amino group, one or several preferably primary hydroxyl groups capable of forming esters. Amino alcohols of this kind are, for example, fatty amines containing hydroxyl groups, such as ethanol amine, propanol amine, butanol amine or unsymmetrically hydroxyalkylated diamines such as N-(hydroxyethyl)- or N,N-di-(hydroxyethyl)-ethylene diamine, N-(hydroxyethyl)-propylene diamine, N,N-di-(hydroxyethyl)-propylene diamine, N-hydroxyethyl-benzidine or cycloaliphatic or aromatic amines having hydroxy groups in the side chain, for example hydroxyethylaminobenzene or dihydroxyethylaminobenzene. Said hydroxyamines react with the paraffin oxidation product, on the one hand, with formation of amide and, on the other hand, with formation of ester. The use of amino alcohols having two hydroxyl groups does not impair the properties of the final products since the hydroxyl groups are less reactive than, for example, primary amino groups in triamines which would yield resinous final products.

As compared with the amides made from the pure acids or acid mixtures mentioned above, the reaction products prepared by the process of the invention have substantially different properties. They are distinguished by an especially high impact strength, flexibility, bending strength and elasticity. The products are hard and possess very low expansion coefficients, they retain their shape and do practically not stick. They are, therefore, excellently suitable for pattern casting, as sealing and impregnating materials, for the protection against corrosion of metals and as separating waxes. The products may be used for the aforesaid application partially alone and partially in admixture with other solid substances with which they can be mixed in the molten state, such as resins or asphalts.

In case dicarboxylic acids are coincidentally used the products have a greater hardness, an improved stability of shape and a reduced expansion with a practically unchanged melting range. The latter fact could not be foreseen and is very important for the industrial applicability of such a reaction product since an undesired raise of the dropping point beyond the admissible limit renders the product useless, for example, in casting even when other important properties are simultaneously improved. Moreover, by the use of dicarboxylic acids the viscosity and tenacity of the products can be varied within wide limits.

The following examples serve to illustrate the invention but they are not intended to limit it thereto.

Example 1

2 kilograms of a paraffin oxidation product having an acid number of 70, a saponification number of 183, a carbonyl number of 95, a hydroxyl number of 18 and a flowing/dropping point of 78.7/79.0° C. (according to Ubbelohde) and containing 1.5% of unaltered paraffin, which had been prepared from a synthetic paraffin (solidification point 98° C., rotating thermometer) by catalytic oxidation with air, were reacted in the course of 17 hours at 140° C. with 444 grams of 4,4'-diaminodicyclohexylmethane. The brown reaction product obtained had an acid number of 24, a saponification number of 77, a flowing/dropping point of 83.0/84.0° C., a penetrometer hardness of below 1 (100 grams load, 5 seconds, 25° C.) and a viscosity of 750 centipoises at 120° C. The nonadhesive product obtained, which had a high stability of shape and a high impact strength, had an expansion of 6.1% at 70° C. and 8.0% at 80° C., calculated on the volume at 20° C.

For comparison there are given in the following the values of an amide wax made from stearic acid and 4,4'-diamino-dicyclohexylmethane: acid number 7.0, flowing/dropping point 172.5/173.0° C., penetrometer hardness 3. Said wax is brittle.

Example 2

2 kilograms of a paraffin oxidation product having an acid number of 75, a saponification number of 190, a carbonyl number of 103, a hydroxyl number of 18.5 and a flowing/dropping point of 78.2/78.5° C. (according to Ubbelohde) and containing 1.2% paraffin, which had been prepared by oxidation with air from a mixture of 90% of synthetic hard paraffin (solidification point 101° C.) and 10% of low molecular polyethylene (melting point 115° C.), were reacted in the course of 7 hours at 140° C. with 147 grams of ethylene diamine. The brown, nonadhesive reaction product obtained, which had a very high impact strength, had an acid number of 15, a saponification number of 86.5, a flowing/dropping point of 79.2/80.0° C., a penetrometer hardness of 6, a viscosity of 895 centipoises at 120° C. and an expansion of 6.8% at 70° C. and 8.0% at 80° C.

For comparison there are given the values of the amide wax from stearic acid and ethylene diamine: acid number 8.5, flowing/dropping point 140/140.5° C., penetrometer hardness 3.5. Said wax is brittle.

Example 3

4 kilograms of a paraffin-free paraffin oxidation product prepared as described in Example 1 having an acid number of 91.5, a saponification number of 233, a carbonyl number of 118, a hydroxyl number of 7, a flowing/dropping point of 69.3/69.6° C. (according to Ubbelohde) were oxidized within 40 minutes with 70% of $CrO_3$ in the form of boiling chromosulfuric acid (110 grams of $CrO_3$/liter), washed with dilute mineral acid until the chromium was removed, then washed with water until the product was free of acid and subsequently dehydrated under reduced pressure.

2 kilograms of the air/chromic acid oxidation product having an acid number of 138, a saponification number of 255, a carbonyl number of 118, a hydroxyl number of 2 and a flowing/dropping point of 72.8/73.0° C. were then reacted in the course of 8 hours at 150° C. with 200 grams of ethylene diamine. The brown, flexible and viscous reaction product obtained had an acid number of 12, a saponification number of 63, a flowing/dropping point of 84.0/85.0° C., a penetrometer hardness of 3 and a viscosity of 830 centipoises at 120° C.

An amide wax from a wax acid prepared by chromic acid oxidation of crude montan wax and ethylene diamine has the following comparable values: acid number 16.5, saponification number 41.5, flowing/dropping point 131.0/131.2° C., penetrometer hardness 1–2. Said wax is very brittle.

Example 4

2000 parts of a paraffin oxidation product having an acid number of 77.5, a saponification number of 178, a carbonyl number of 94, a hydroxyl number of 19, a flowing/dropping point of 80.3/81.3° C. (according to Ubbelohde) and containing 2.0% of paraffin, which had been prepared by catalytic oxidation with air of a synthetic paraffin (solidification point 98° C., rotating thermometer), were reacted in the course of 11 hours at 140° C. with 480 parts of 4,4'-diamino-diphenylmethane. The red brown reaction product obtained had an acid number of 22, a saponification number of 94, a flowing/dropping point of 78.0/78.5° C. (according to Ubbelohde), a penetrometer hardness of 6 (100 grams load, 5 seconds, 25° C.) and a viscosity of 520 centipoises at 120° C.

The product, which had a high stability of shape and a high impact strength, had an expansion of 6.5% at 70° C. and 7.7% at 80° C., calculated on the volume at 20° C.

Example 5

300 parts of a paraffin oxidation product having an acid number of 70, a saponification number of 200, a hydroxyl number of 13, a carbonyl number of 84, a flowing/dropping point of 80.5/81.3° C. (according to Ubbelohde) and containing 2% of paraffin, which had been prepared by catalytic oxidation with air of a synthetic paraffin (solidification point 101° C. at the rotating thermometer), and 6 parts of adipic acid were reacted at 140° C. with 25 parts of ethylene diamine. The brown, viscous reaction product obtained had an acid number of 19, a saponification number of 98, a flowing/dropping point of 83.5/84.0° C. (according to Ubbelohde), a penetrometer hardness of 3 (100 grams load, 5 seconds, 25° C.), a viscosity of 1100 centipoises at 120° C. and an expansion of 6.8% at 70° C. and 8.0% at 80° C., calculated on the volume at 20° C.

The analogous amidation product prepared without the addition of adipic acid showed the following comparable values: acid number 19, saponification number 101, flowing/dropping point 82/83° C., penetrometer hardness 6, viscosity 870 centipoises at 120° C., expansion 7.0% at 70° C. and 8.5% at 80° C.

Example 6

200 parts of a paraffin oxidation product having an acid number of 73, a saponification number of 184, a hydroxyl number of 17, a carbonyl number of 78 and a flowing/dropping point of 78.6/79.2° C. (according to Ubbelohde) and containing 1.7% of paraffin, which had been prepared by catalytic oxidation with air of a synthetic paraffin (solidification point 99° C. at the rotating thermometer), and 22 parts of diphenoxyacetic acid dimethylmethane were reacted at 150° C. with 20.5 parts of ethylene diamine. The brown reaction product obtained having a very high impact strength had an acid number of 8, a saponification number of 60, a flowing/dropping point of 82/83° C. (according to Ubbelohde), a penetrometer hardness of 4, a viscosity of 630 centipoises at 120° C. and an expansion of 6% at 70° C. and 7.4% at 80° C., calculated on the volume at 20° C.

The analogous reaction product prepared without the addition of dicarboxylic acid had an acid number of 8, a saponification number of 62, a flowing/dropping point of 84/85° C. (according to Ubbelohde), a penetrometer hardness of 6, a viscosity of 295 centipoises at 120° C. and an expansion of 6.8% at 70° C. and 8.4% at 80° C., calculated on the volume at 20° C.

The stability of shape of the latter product was only half as large as that of the reaction product made with dicarboxylic acid.

*Example 7*

300 parts of a paraffin oxidation product having an acid number of 71.5, a saponification number of 147, a hydroxyl number of 25, a carbonyl number of 88 and a flowing/dropping point of 78/79° C. (according to Ubbelohde) and containing 2% of paraffin, which had been prepared by catalytic oxidation with air of a synthetic paraffin (solidification point 101° C., rotating thermometer), and 34 parts of diphenoxyacetic acid dimethylmethane were reacted at 150° C. with 35 parts of N-hydroxyethylpropane diamine. The dark brown reaction product obtained having a high impact strength had an acid number of 22, a saponification number of 128, a flowing/dropping point of 78.5/80.0° C. (according to Ubbelohde), a penetrometer hardness of 7 (100 grams load, 5 seconds, 25° C.), a viscosity of 1050 centipoises at 120° C. and an expansion of 6.6% at 70° C. and 8.0% at 80° C., calculated on the volume at 20° C.

*Example 8*

300 parts of a paraffin oxidation product having an acid number of 73.5, a saponification number of 183, a carbonyl number of 78, a hydroxyl number of 17.5 and a flowing/dropping point of 78.6/79.2° C. (according to Ubbelohde) and containing 1.7% of paraffin, which had been prepared by catalytic oxidation with air of a synthetic paraffin (solidification point 98° C., rotating thermometer), were reacted at 160° C. with 22 parts of N,N-dihydroxyethylpropane diamine. The brown reaction product obtained, which had a high impact strength and a high stability of shape, had an acid number of 25, a saponification number of 145, a flowing/dropping point of 78.6/79.0° C. (according to Ubbelohde), a penetrometer hardness of 10 (100 grams load, 5 seconds, 25° C.), a viscosity of 233 centipoises at 120° C. and an expansion of 7.7% at 70° C. and 8.6% at 80° C., calculated on the volume at 20° C.

Obviously many modifications and variations of the present invention are possible in the light of the above teachings. It is, therefore, to be understood that within the scope of the appended claims the invention may be practiced otherwise than as specifically described.

We claim:

1. Waxy amidation products consisting of a reaction product of a crude air-oxidation product of a paraffin hydrocarbon which hydrocarbon has a solidification point above 60° C., in said air-oxidation product at least 80 percent of the paraffin being oxidized with at least one polyvalent amine having an atom chain of 4 to 12 and which contains at least one primary amino group and furthermore a radical being selected from the group consisting of one primary amino group and at least one primary hydroxyl group, the crude air-oxidation product containing carboxylic groups in an amount equivalent to an acid number of at most 138 and at least about 65% of said carboxylic groups being reacted with the said polyvalent amine.

2. Amidation products as claimed in claim 1, wherein a part of the alcoholic groups and carbonyl groups is converted into carboxylic groups after the air-oxidation but before the amidation.

3. Amidation products as claimed in claim 1, wherein a paraffin air-oxidation product is used as starting material in which less than 10 percent of the paraffin is unchanged.

4. Waxy amidation products consisting of a waxy reaction product of crude air-oxidation product of a paraffin hydrocarbon which hydrocarbon has a solidification point above 60° C., in said air-oxidation product at least 80 percent of the paraffin being oxidized, with at least one polyvalent amine having an atom chain of 4 to 12 and which contains two primary amino groups, the crude air-oxidation product containing carboxylic groups in an amount equivalent to an acid number of at most 138 and at least about 65% of said carboxylic groups being reacted with the said polyvalent amine.

5. A process for the manufacture of waxy amidation products of crude oxidation products which comprises air-oxidizing a high molecular paraffin hydrocarbon having a solidification point above 60° C. until at least 80 percent of the paraffin are oxidized and then amidating these crude air-oxidation products at a temperature above 100° C. by a polyvalent amine having an atom chain of 4 to 12 and which contains one primary group and further radical being selected from the group consisting of one primary amino group and at least one primary hydroxyl group, the crude air-oxidation product containing carboxylic groups in an amount equivalent to an acid number of at most 138 and at least about 65% of said carboxylic groups being reacted with the said polyvalent amine.

6. A process for the manufacture of waxy amidation product of crude oxidation products which comprises air-oxidizing a high molecular paraffin hydrocarbon having a solidification point above 60° C. until at least 80 percent of the paraffin are oxidized, treating these crude air-oxidation products with chromosulfuric acid in an amount of 50 to 90 percent $CrO_3$, calculated on the air-oxidation product, so as to convert a part of the alcoholic groups and carbonyl groups which are present in said crude air-oxidation product, into carboxylic groups and then reacting the crude products thus obtained at a temperature above 100° C. with a polyvalent amine having an atom chain of 4 to 12 and which contains one primary amino group and further radical selected from the group consisting of a primary amino group and at least one primary hydroxyl group, the products bleached with chromosulfuric acid containing carboxylic groups in an amount equivalent to an acid number of at most 138 and at least about 65% of said carboxylic groups being reacted with the said polyvalent amine.

7. A process for the manufacture of waxy amidation products of crude oxidation products which comprises air-oxidizing a high molecular paraffin hydrocarbon having a solidification point above 60° C. until at least 80 percent of the paraffin are oxidized and then amidating these crude air-oxidation products at a temperature above 100° C. by a polyvalent amine having an atom chain of 4 to 12 and which contains two primary amino groups, the crude air-oxidation product containing carboxylic groups in an amount equivalent to an acid number of at most 138 and at least about 65% of said carboxylic groups being reacted with the said polyvalent amine.

8. A process as claimed in claim 5, wherein the paraffins are air-oxidized until more than 90 percent are oxidized.

9. Waxy amidation products consisting of an amidated mixture of dicarboxylic acids having a chain of from 2 to 17 atoms between the carboxylic acid groups, said chain containing double bonds at the most, and a crude air-oxidation product of a paraffin hydrocarbon which hydrocarbon has a solidification point above 60° C., in said air-oxidation product at least 80 percent of the paraffin being oxidized, the amide component being a polyvalent amine having an atom chain of 4 to 12 and containing one primary amino group and further radical selected from the group consisting of one primary amino group and at least one primary hydroxyl group, the crude air-oxidation product containing carboxylic groups in an amount equivalent to an acid number of at most 138 and at least about 65% of said carboxylic groups being reacted with the said polyvalent amine.

10. Waxy amidation products consisting of an amidated mixture of dicarboxylic acids having up to 23 carbon atoms, said chain containing double bonds at the most, and a crude air-oxidation product of a paraffin hydrocarbon which hydrocarbon has a solidification point above 60° C., in said air-oxidation product at least 80 percent of the paraffin being oxidized, the amide component being a polyvalent amine having an atom chain of 4 to 12 and containing one primary amino group and further radical selected from the group consisting of one primary amino group and at least one primary hydroxyl group, the crude air-oxidation product containing carboxylic groups in an amount equivalent to an acid number of at most 138 and at least about 65% of said carboxylic groups being reacted with the said polyvalent amine.

11. Waxy amidation products consisting of a reaction product of a crude air-oxidation product of a paraffin hydrocarbon has a solidification point above 85° C., in said air-oxidation product at least 90 percent of the paraffin being oxidized, with at least one polyvalent amine having an atom chain of 4 to 12 and which contains at least one primary amino group and furthermore a radical being selected from the group consisting of one primary amino group and at least one primary hydroxyl group, the crude air-oxidation product containing carboxylic groups in an amount equivalent to an acid number of at most about 92 and at least about 65% of said carboxylic groups being reacted with the said polyvalent amine.

12. Amidation products as claimed in claim 9, wherein the dicarboxylic acid component is present in an amount ranging from 2 to 15 parts by weight calculated upon the amount of the paraffin oxidation product.

13. A process as claimed in claim 5, wherein a paraffin is used as starting material which has a solidification point above 85° C.

14. A process as claimed in claim 5, wherein a paraffin is used as starting material which has been obtained by the catalytic hydrogenation of carbon monoxide.

15. A process as claimed in claim 5, wherein a paraffin is used as starting material which contains up to about 40 percent of polyethylene.

16. A process as claimed in claim 5, wherein up to 20% of at least one compound selected from the group consisting of dicarboxylic acids having a chain of from 2 to 17 atoms between the carboxylic acid groups, said chain containing double bonds at the most, and derivatives thereof which are amidated under the amidation conditions applied is added to the crude paraffin oxidation product.

17. A process as claimed in claim 16, wherein at least one of said dicarboxylic acids is added to the crude paraffin oxidation product in an amount ranging from 2 to 15 percent by weight calculated upon the amount of the crude paraffin oxidation product.

References Cited in the file of this patent
UNITED STATES PATENTS

| | | |
|---|---|---|
| 2,356,408 | Kelley | Aug. 22, 1944 |
| 2,408,700 | Sprung | Oct. 1, 1946 |
| 2,695,303 | Buckmann | Nov. 23, 1954 |
| 2,727,836 | Brillhart | Dec. 20, 1955 |